Patented June 30, 1936

2,046,277

UNITED STATES PATENT OFFICE 2,046,277

CHLORINATED RUBBER COMPOSITION

Emil Ott, Elsmere, Del., assignor to Hercules Powder Company, Wilmington, Del., a corporation of Delaware No Drawing. Application February 2, 1935, Serial No. 4,633

12 Claims. (Cl. 106—23)

This invention relates to a chlorinated rubber composition, and more particularly to a chlorinated rubber composition comprising chlorinated rubber plasticized with a sulfurized terpene compound. The composition in accordance with this invention may be dissolved in solvents to form a coating composition or may be used as a plastic for the production of molded articles.

The chlorinated rubber to be employed in the production of the composition in accordance with this invention may be made from raw or vulcanized rubber by any of the methods known for its manufacture. Preferably a chlorinated rubber having a chlorine content of about 67% will be employed, but it will be understood that rubber containing any substantial percentage of chlorine, say as low as 50%, will be usable. The viscosity characteristic of the chlorinated rubber to be used will depend upon the type of composition desired. For a coating composition the chlorinated rubber will preferably have a viscosity of from about 10 to about 100,000 centipoises in 20% solution in xylol at 25° C. Where the chlorinated rubber is to be used in the formulation of plastics or molded objects, products of much higher viscosity may be used.

Sulfurized terpene compounds, as, for example, sulfurized pine oil, sulfurized pinene, sulfurized turpentine, sulfurized dipolymer ("Dipolymer" is the commonly used designation of a certain terpene polymer. The production and properties of dipolymer are described in, among others, U. S. Patents Nos. 1,691,065; 1,691,067; 1,691,068; 1,691,069; and 1,691,573; issued November 13, 1928, to Irvin W. Humphrey), and the like, may be produced by heating the respective terpene compounds with sulfur, the method being more fully disclosed in U. S. Patent No. 1,844,400, issued February 9, 1932, to William H. Kobbe. Preferably the reaction between the terpene compound and sulfur will be effected in a non-oxidizing atmosphere in order to avoid discoloration of the product, such procedure being described and claimed in an application Serial No. 723,329, filed May 1, 1934 by Joseph N. Borglin. If the sulfurized terpene compound is dark in color it will desirably be refined before use by treatment with, for example, stannic chloride, as is more fully set out in an application Serial No. 723,330, filed May 1, 1934 by Joseph N. Borglin.

Rosin oil, while not a terpene compound, may be sulfurized as described above, and the sulfurized rosin oil used in the production of compositions in accordance with this invention. For the purposes of this invention, and within the scope of the claims hereinafter set forth, sulfurized rosin oil is accordingly considered as an equivalent of a sulfurized terpene compound.

The sulfur content of the sulfurized terpene compounds used in the compositions in accordance with this invention will vary with the particular sulfurized terpene compound employed. Thus, for example, sulfurized pine oil having a sulfur content of from 1% to $6\frac{3}{10}$%, sulfurized pinene having a sulfur content of from 2% to 20%, sulfurized dipolymer having a sulfur content of from 2% to 20%, and sulfurized rosin oil of 1% to 7% sulfur content are all very satisfactory materials for use in accordance with this invention.

The composition in accordance with this invention comprises chlorinated rubber and a sulfurized terpene compound, as, for example, sulfurized pine oil, sulfurized pinene, sulfurized turpentine, sulfurized dipolymer, etc., or sulfurized rosin oil, either alone or in admixture with one another. The chlorinated rubber and sulfurized terpene compound may be present in any proportion in which they are compatible, but preferably the sulfurized terpene compound will be present in from about 25% to about 100% by weight of the amount of chlorinated rubber present. Indeed, where great pliability or flexibility is desired, the range will preferably be from about 40% to about 100%.

Other ingredients, including additional plasticizers, as, for example, chlorinated paraffin, fish oil, drying oils, etc., resins, as, for example, cumarone resins, phenol-formaldehyde resins, polybasic acid, polyhydric alcohol resins, etc.; pigments; fillers; etc., may be added if desired. Where the composition is to be used as a coating composition, a solvent, as, for example, toluol, xylol, ethylene, etc. will be used in quantity sufficient to produce a liquid coating composition of the desired viscosity, solids content, etc.

The ingredients of the composition in accordance with this invention may be admixed or blended by solution in a common solvent, by heating and/or rolling or kneading, or by any other methods commonly employed for such purposes.

A preferred sulfurized terpene plasticizer for use in the production of compositions in accordance with this invention comprises a sulfurized mixture of turpentine and dipolymer, preferably in the proportion of 15% turpentine and 85% dipolymer, containing about 20% sulfur. This sulfurized terpene mixture or blend is a most excellent plasticizer for chlorinated rubber.

When used as a coating composition the composition in accordance with this invention produces protective films of excellent adhesion, flexibility and elasticity, and of exceptional resistance to the attack of chemicals, such as, for example, sodium hydroxide, hydrochloric acid, salt solution, potassium cyanide, etc. This combination of properties is not possessed by any coating composition heretofore known. In addition to being used as a protective coating for metal and wood surfaces, the coating compositions herein described may be used to advantage in coating cloth, paper and other materials where high flexibility is required.

The various solutions the formulae of which are given below are illustrative of different types of coating compositions produced in accordance with this invention.

*I—As chemically resistant films*

| Solution No. | 1 | 2 | 3 | 4 | 5 | 6 | 7 |
|---|---|---|---|---|---|---|---|
| Chlorinated rubber | 20 | 20 | 20 | 20 | 20 | 20 | 20 |
| Sulfurized terpene blend | 5 | 8 | 10 | 13 | 15 | 18 | 20 |
| Xylol | 80 | 80 | 80 | 80 | 80 | 80 | 80 |

*II—As pigmented protective coating*

| Solution No. | 1 | 2 | 3 | 4 | 5 | 6 | 7 |
|---|---|---|---|---|---|---|---|
| Chlorinated rubber | 20 | 20 | 20 | 20 | 20 | 20 | 20 |
| Sulfurized terpene blend | 5 | 8 | 10 | 13 | 15 | 18 | 20 |
| Indian red pigment | 10 | 12 | 13 | 14 | 15 | 16 | 17 |
| Xylol | 80 | 60 | 40 | 20 |  | 40 | 80 |
| Hiflash naphtha |  | 20 | 40 | 60 | 80 | 40 |  |

*III—As a cloth coating*

| Solution No. | 1 | 2 | 3 |
|---|---|---|---|
| Chlorinated rubber | 20 | 20 | 20 |
| Sulfurized terpene blend | 10 | 13 | 15 |
| Toluol | 80 | 80 | 80 |

*IV—As a paper coating*

| Solution No. | 1 | 2 | 3 |
|---|---|---|---|
| Chlorinated rubber | 20 | 20 | 20 |
| Sulfurized terpene blend | 13 | 18 | 20 |
| Ester gum | 2 | 2 | 2 |
| Paraffin | 1 | 1 | 1 |
| Toluol | 80 | 80 | 80 |

*V—With other plasticizers*

| Solution No. | 1 | 2 | 3 | 4 | 5 | 6 |
|---|---|---|---|---|---|---|
| Chlorinated rubber | 20 | 20 | 20 | 20 | 20 | 20 |
| Sulfurized terpene blend | 13 | 7 | 13 | 7 | 13 | 7 |
| Chlorinated paraffin | 7 | 13 |  |  |  |  |
| Fish oil |  |  | 7 | 13 |  |  |
| Thermolized tung oil |  |  |  |  | 7 | 13 |
| Xylol |  |  |  |  |  |  |

The details and examples hereinbefore set forth are illustrative only, and are not to be considered as in any way limiting the invention as herein broadly described and claimed.

What I claim and desire to protect by Letters Patent is:

1. A composition comprising chlorinated rubber and a sulfurized terpene compound.
2. A composition comprising chlorinated rubber and sulfurized pine oil.
3. A composition comprising chlorinated rubber and sulfurized pinene.
4. A composition comprising chlorinated rubber and sulfurized dipolymer.
5. A composition comprising chlorinated rubber and a sulfurized mixture of turpentine and dipolymer.
6. A composition comprising chlorinated rubber, a sulfurized terpene compound and another plasticizer.
7. A composition comprising chlorinated rubber, a sulfurized terpene compound and a resin.
8. A composition comprising chlorinated rubber, a sulfurized terpene compound and a pigment.
9. A composition comprising chlorinated rubber, a sulfurized terpene compound and a solvent.
10. A composition comprising chlorinated rubber and a sulfurized terpene compound, the sulfurized terpene compound being present in amount of from about 25% to about 100% by weight of the chlorinated rubber.
11. A composition comprising chlorinated rubber and a sulfurized terpene compound, the sulfurized terpene compound being present in amount of from about 40% to about 100% by weight of the chlorinated rubber.
12. A composition comprising chlorinated rubber and a sulfurized mixture of about 15% turpentine and about 85% dipolymer, said sulfurized mixture containing about 20% sulfur.

EMIL OTT.